(12) United States Patent
Faraldi et al.

(10) Patent No.: US 9,846,069 B2
(45) Date of Patent: Dec. 19, 2017

(54) LEVEL MEASUREMENT SYSTEM FOR CONDUCTIVE LIQUIDS

(71) Applicant: Electrolux Home Products Corporation N. V., Brussels (BE)

(72) Inventors: Paolo Faraldi, Forli (IT); Giacomo Martello, Forli (IT); Riccardo Foiera, Forli (IT); Nicola Valpiani, Forli (IT); Edoardo Betti, Forli (IT)

(73) Assignee: Electrolux Home Products Corporation N.V., Brussels (BE)

( * ) Notice: Subject to any disclaimer, the term of this patent is extended or adjusted under 35 U.S.C. 154(b) by 0 days.

(21) Appl. No.: 14/439,448

(22) PCT Filed: Jan. 14, 2014

(86) PCT No.: PCT/EP2014/050566
§ 371 (c)(1),
(2) Date: Apr. 29, 2015

(87) PCT Pub. No.: WO2014/111369
PCT Pub. Date: Jul. 24, 2014

(65) Prior Publication Data
US 2015/0308877 A1  Oct. 29, 2015

(30) Foreign Application Priority Data
Jan. 15, 2013 (EP) .................... 13151285

(51) Int. Cl.
*G01F 23/24* (2006.01)
*G01F 23/00* (2006.01)
(52) U.S. Cl.
CPC .......... *G01F 23/24* (2013.01); *G01F 23/0061* (2013.01); *G01F 23/243* (2013.01)
(58) Field of Classification Search
CPC ..... G01F 23/0061; G01F 23/24; G01F 23/243
(Continued)

(56) References Cited

U.S. PATENT DOCUMENTS 4,099,406 A * 7/1978 Fulkerson .............. G01N 27/06
                                                    73/304 R
4,382,382 A * 5/1983 Wang .................... G01F 23/243
                                                    340/620
(Continued)

FOREIGN PATENT DOCUMENTS

CN        201285310 Y     8/2009
CN        201497543 U     6/2010
GB        2052251 A *     1/1981  ......... A47L 15/0026

OTHER PUBLICATIONS

International Search Report for PCT/EP2014/050566, dated Feb. 27, 2014, 2 pages.
(Continued)

*Primary Examiner* — Peter Macchiarolo
*Assistant Examiner* — Nathaniel Kolb
(74) *Attorney, Agent, or Firm* — Pearne & Gordon LLP

(57) ABSTRACT

A level measurement system for conductive liquids including a liquid container (10) and at least three electrodes (18, 20, 22) arranged inside the liquid container (10) at different levels. The electrodes (18, 20, 22) are connected to a network including a plurality of resistor elements (R, R1, R2, R3, RP1, RP2, RR1, RR2). The network includes at least two input terminals (V+, GND) for applying an external voltage and at least two output terminals providing a voltage depending on the level of the conductive liquid in the liquid container (10). The level measurement system is provided for detecting at least three different levels of conductive liquids in the liquid container (10) and indicating the levels by one voltage value. The level measurement system may be used for water in a storage container such as in a domestic appliance having a liquid container for supplying the domestic appliance with liquid.

10 Claims, 4 Drawing Sheets

Figure 1:
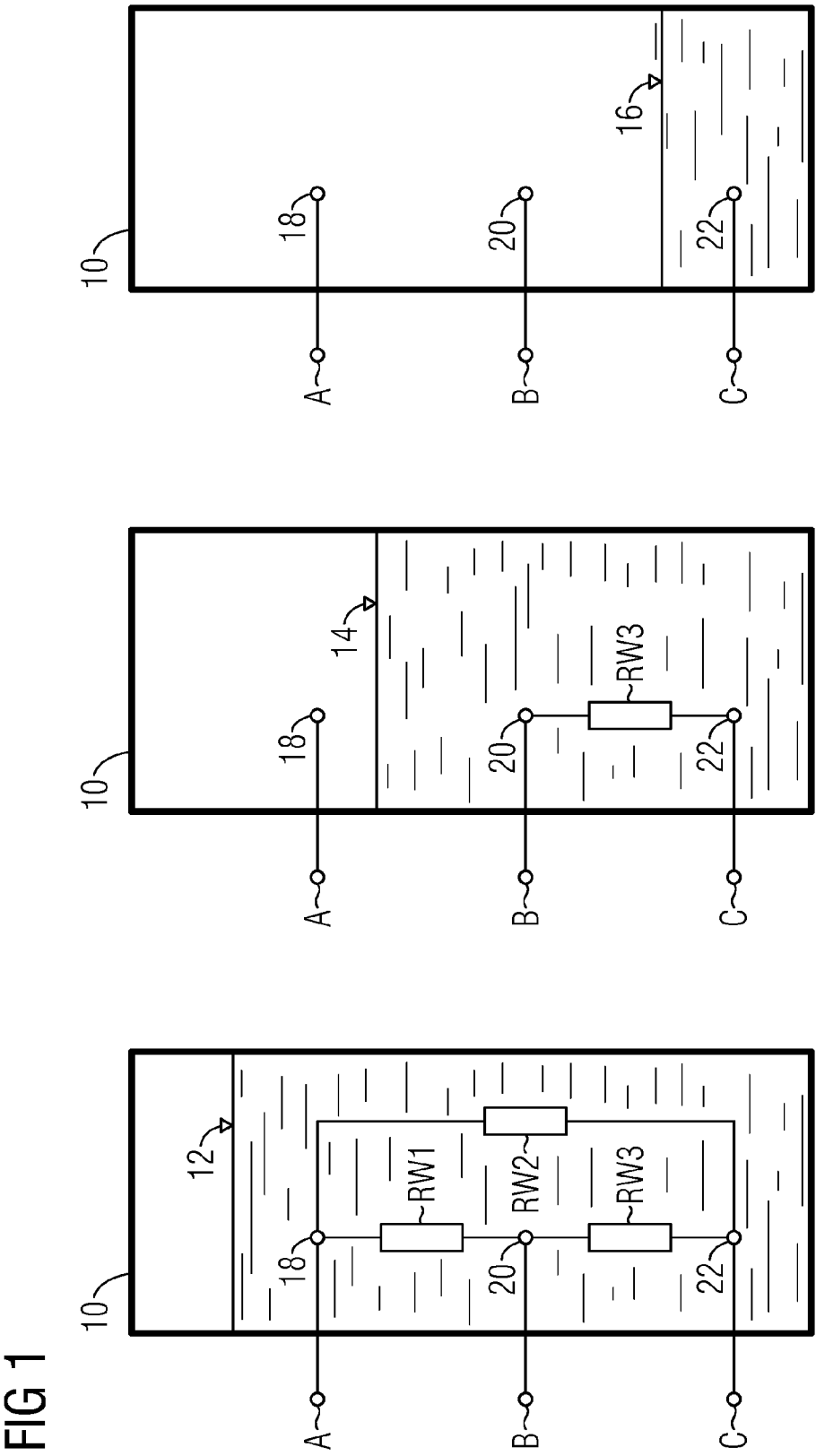

(58) Field of Classification Search
USPC .......................................................... 73/304 R
See application file for complete search history.

(56) References Cited

U.S. PATENT DOCUMENTS

| | | | | |
|---|---|---|---|---|
| 4,736,622 | A * | 4/1988 | Miller ................. | G01M 3/3245 |
| | | | | 340/620 |
| 5,142,909 | A | 9/1992 | Baughman | |
| 6,219,933 | B1 | 4/2001 | Taniguchi et al. | |
| 7,021,137 | B1 * | 4/2006 | Milone ................. | E21B 47/042 |
| | | | | 73/304 R |
| 2006/0021432 | A1 * | 2/2006 | Salzmann ............. | G01F 23/243 |
| | | | | 73/304 R |

OTHER PUBLICATIONS

EP OA for EP application 13151285.7 dated Jul. 7, 2017.
European Search Report for EP application 13151285.7, dated Jul. 10, 2013.

* cited by examiner

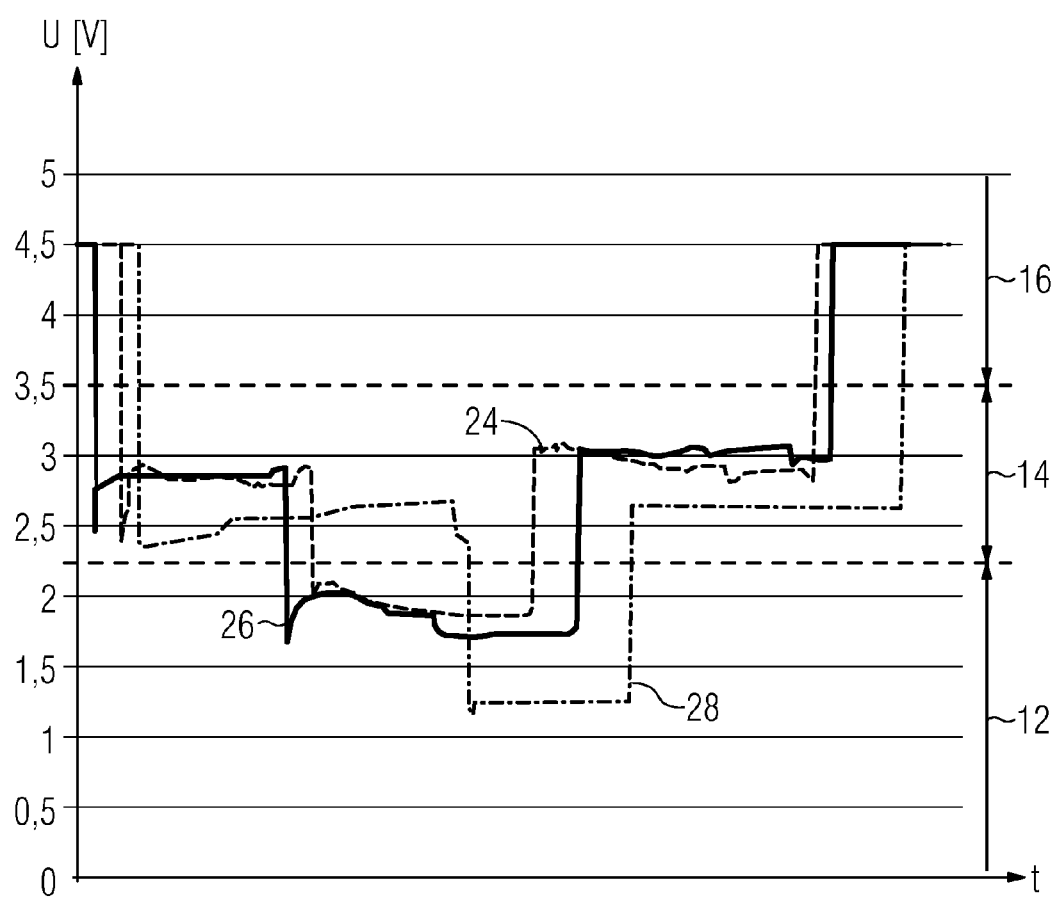

LEVEL MEASUREMENT SYSTEM FOR CONDUCTIVE LIQUIDS

The present invention relates to a level measurement system for conductive liquids. In particular, the present invention relates to a level measurement system for water in a storage container. Further, the present invention relates to a domestic appliance comprising at least one liquid container for supplying said domestic appliance with liquid.

Level measurement of water in storage containers is a substantial feature for any application requiring a feed of water. The information about the level status is relevant for the control of said application, e.g. for launching warning messages or triggering refill or drain actions by specific actuators.

Conductivity sensors are well known and used for a discrete level measurement. Two electrodes are arranged inside a liquid container at different levels. If the liquid level is above both electrodes, then an electric circuit is closed and said liquid level above an upper electrode is detected. If the liquid level is below the upper electrode, then the electric circuit is open and said liquid level below the upper electrode is detected. This system allows only the determination, if the liquid level is above or below a defined level.

It is an object of the present invention to provide a level measurement system, which allows a more exact measuring of the liquid level by low complexity.

The object of the present invention is achieved by the level measurement system according to claim 1.

According to the present invention the level measurement system for conductive liquids includes a liquid container and at least three electrodes arranged inside the liquid container at different levels, wherein
- the electrodes are connected to a network comprising a plurality of resistor elements,
- the network comprises at least two input terminals for applying an external voltage, and
- the network comprises at least two output terminals providing a voltage depending on the level of the conductive liquid in the liquid container,
- so that the level measurement system is provided for detecting at least three different levels of conductive liquids in the liquid container and indicating said levels by one voltage value.

Major aspects of the present invention refer to the at least three electrodes arranged inside the liquid container at different levels and the network of resistor elements connected to said electrodes. One voltage value is sufficient to indicate the at least three different levels of the conductive liquids in the liquid container. The electrodes and the resistor elements allow the level measurement system by low complexity.

According to a preferred embodiment of the present invention the level measurement system includes or corresponds with an analog-digital converter for processing the level of the conductive liquid in the liquid container.

In particular, the at least two output terminals of the network are connected or connectable to an input of the analog-digital converter. The output of the analog-digital converter may be processed by a control unit for further applications.

For example, the external voltage is a direct current voltage.

Alternatively, the external voltage is an alternating current voltage. This avoids polarization effects on the electrodes and accumulations of substances on said electrodes.

Further, the level measurement system may be provided for determining the electric conductivity of the liquid.

In particular, the level measurement system may be provided for determining the hardness grade of water or liquids including water.

Moreover, predetermined voltage ranges of the voltage between the output terminals are defined, wherein each voltage range corresponds with one discrete level of the conductive liquid in the liquid container.

At last, the present invention relates to a domestic appliance comprising at least one liquid container for supplying said domestic appliance with liquid, wherein the domestic appliance comprises at least one level measurement system mentioned above.

Novel and inventive features of the present invention are set forth in the appended claims.

Figure 2:
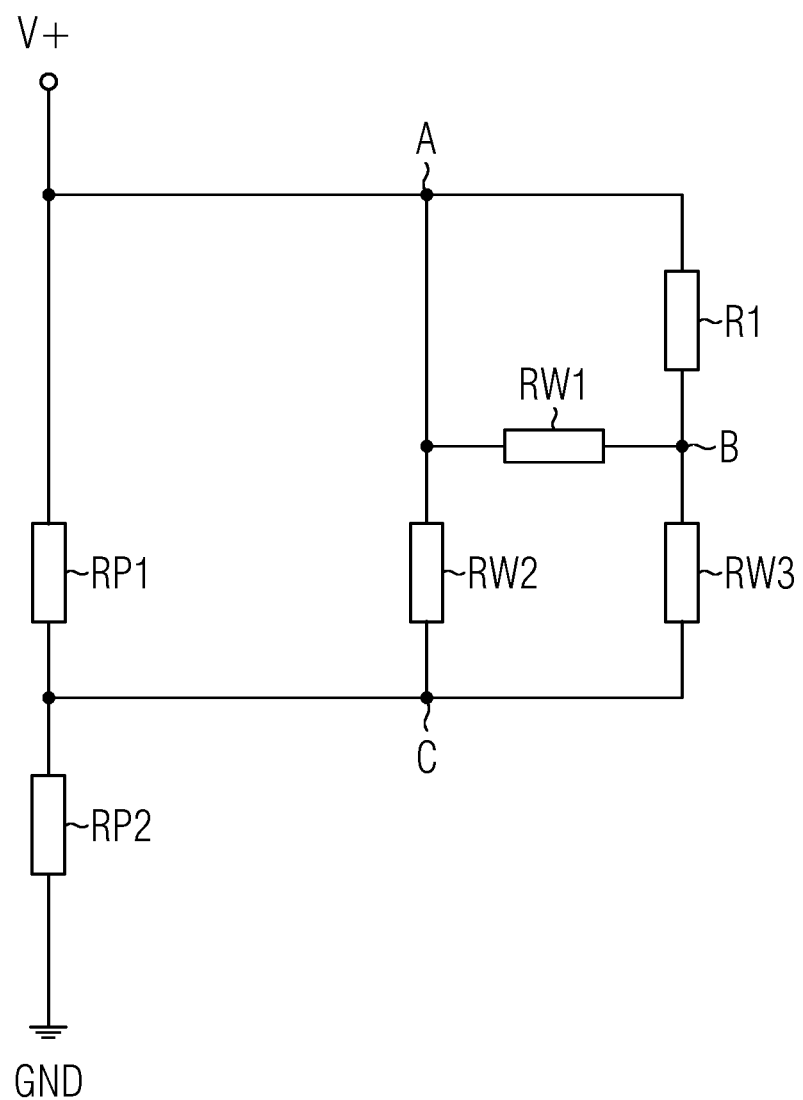
Figure 3:
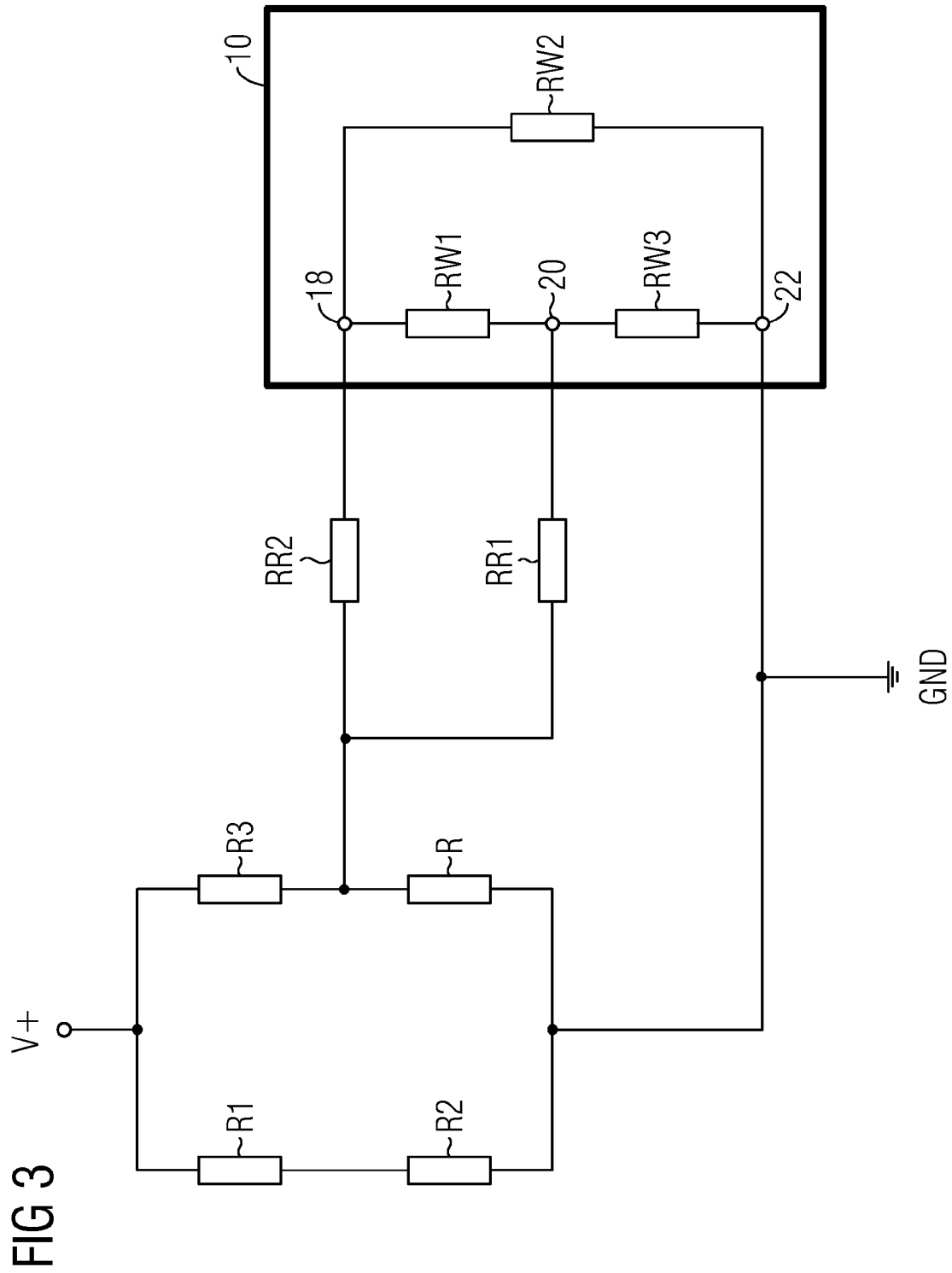

The present invention will be described in further detail with reference to the drawings, in which FIG. 1 illustrates a schematic side view of a liquid container filled at three different liquid levels of a level measurement system according to a preferred embodiment of the present invention, FIG. 2 illustrates a schematic equivalent circuitry of the level measurement system according to a first embodiment of the present invention, FIG. 3 illustrates a schematic equivalent circuitry of the level measurement system according to a second embodiment of the present invention, and FIG. 4 illustrates three voltage-time diagrams of the level measurement system according to the preferred embodiment of the present invention.

FIG. 1 illustrates a schematic side view of a liquid container 10 filled at three different liquid levels 12, 14 and 16 of a level measurement system according to a preferred embodiment of the present invention. The liquid container 10 is filled by an electrically conductive liquid, e.g. water.

The liquid container 10 is shown triply, wherein said container 10 is filled at an upper level 12, a medium level 14 and a lower level 16, respectively. The level measurement system includes an upper electrode 18, a medium electrode 20 and a lower electrode 22. The upper electrode 18, the medium electrode 20 and the lower electrode 22 are arranged inside the liquid container 10. The upper level 12 is defined as one of the levels above the upper electrode 18. The medium level 14 is defined as one of the levels between the upper electrode 18 and the medium electrode 20. In a similar way, the lower level 16 is defined as one of the levels between the medium electrode 20 and the lower electrode 22.

A first terminal A is connected to the upper electrode 18. In a similar way, a second terminal B is connected to the medium electrode 20. At last, a third terminal C is connected to the lower electrode 22.

In FIG. 1 the electric resistances of the liquid between the electrodes 18, 20 and 22 are represented by symbols RW1, RW2 and RW3. Said symbols RW1, RW2 and RW3 are pictured as the wiring symbols of resistor elements. RW1 represents the resistance between the upper electrode 18 and the medium electrode 20. RW2 represents the resistance between the upper electrode 18 and the lower electrode 22. RW3 represents the resistance between the medium electrode 20 and the lower electrode 22.

If the liquid container 10 is filled at the upper level 12, then the electric resistances RW1, RW2 and RW3 of the liquid have measurable values. However, if the liquid container 10 is filled at the medium level 14, then only the electric resistance RW3 of the liquid has a measurable value, while the electric resistances RW1 and RW2 are infinite. Moreover, if the liquid container 10 is filled at the lower level 16, then all three electric resistances RW1, RW2 and RW3 are infinite.

FIG. 2 illustrates a schematic equivalent circuitry of the level measurement system according to a first embodiment of the present invention. The level measurement system of the first embodiment relates to the liquid container 10 shown in FIG. 1.

RW1 represents the resistance of the liquid between the upper electrode 18 and the medium electrode 20. RW2 represents the resistance of the liquid between the upper electrode 18 and the lower electrode 22. RW3 represents the resistance of the liquid between the medium electrode 20 and the lower electrode 22. The upper electrode 18 is connected to the first terminal A. The medium electrode 20 is connected to the second terminal B. The lower electrode 22 is connected to the third terminal C.

The level measurement system further includes resistor elements R1, RP1 and RP2. The resistor elements RP1 and RP2 are serially interconnected between a voltage terminal V+ and a ground terminal GND. The resistor elements RP1 and RP2 form a voltage divider. The first terminal A is connected to the voltage terminal V+. The third terminal C is connected to a junction between the resistor elements RP1 and RP2. The resistor element R1 is interconnected between the first terminal A and the second terminal B.

The resistor element R1 is dimensioned in such a way that the level measurement system allows a clear distinction between the detected measurements of the upper level 12 and the medium level 14. The voltage across the resistor element RP2 is considered for the measurement. The upper level 12, the medium level 14 and the lower level 16 correspond with a related voltage range across the resistor element RP2 in each case. The related voltage ranges are adapted to different values of the water hardness, if the liquid is water or includes water. The resistance between the electrodes 18, 20 and/or 22 depends on the water hardness.

The resistor value R1 can be dimensioned preferably considering typical ranges of water resistivity with different water hardnesses. Accordingly, it has been found in the present invention that a typical value range of 100 to 300 kOhm is suitable for many cases and is suitable even for a majority of cases. Consequently, dimensioning of the other resistors shall be preferably:

$$RP1=RP2\cong 3*R1$$

The voltage across the resistor element RP2 is connectable to the input terminals of an analog-digital converter. Thus, a single analog-digital converter channel is sufficient to detect a plurality of levels 12, 14 and/or 16.

FIG. 3 illustrates a schematic equivalent circuitry of the level measurement system according to a second embodiment of the present invention. The level measurement system of the second embodiment relates also to the liquid container 10 shown in FIG. 1.

RW1 represents the resistance of the liquid between the upper electrode 18 and the medium electrode 20. RW2 represents the resistance of the liquid between the upper electrode 18 and the lower electrode 22. RW3 represents the resistance of the liquid between the medium electrode 20 and the lower electrode 22.

The level measurement system includes resistor elements R, R1, R2, R3, RR1 and RR2. The resistor elements R1 and R2 are connected in series between the voltage terminal V+ and the ground terminal GND. In a similar way, the resistor elements R3 and R are connected in series between the voltage terminal V+ and the ground terminal GND.

The upper electrode 18 is connected to a resistor element RR2. The other terminal of said resistor element RR2 is connected to the junction between the resistor elements R3 and R. The medium electrode 20 is connected to a resistor element RR1. The other terminal of said resistor element RR1 is also connected to the junction between the resistor elements R3 and R. The lower electrode 22 is connected to the ground terminal GND.

The resistor elements R1, R2 are optional and allow an increased precision. The resistor elements R, R1, R2, R3, RR1 and RR2 are dimensioned in order to allow a clear distinction between the detected measurements of the upper level 12 and the medium level 14. The voltage across the resistor element R is considered for the measurement. The upper level 12, the medium level 14 and the lower level 16 correspond with a related voltage range across the resistor element R in each case. The related voltage ranges are adapted to different values of the water hardness, if the liquid is water or includes water. The resistance of the water between the electrodes 18, 20 and/or 22 depends on the water hardness.

Preferably, the resistor R1 value can be the same as for the example circuitry previously explained, i.e. in a a value range of 100 to 300 kOhm. Dimensioning of the other resistors shall be preferably:

$$R1 \cong R3 \cong RR1$$

$$R2 \cong R1/10$$

$$RR2 \cong RR1/100$$

$$R \geq 10*R3$$

The voltage across the resistor element R is connectable to the input terminals of the analog-digital converter. Therefore, the single analog-digital converter channel is sufficient to detect a plurality of levels 12, 14 and/or 16.

FIG. 4 illustrates three voltage-time diagrams of the level measurement system according to the preferred embodiment of the present invention. The voltage-time diagrams relate to charges of water having a different hardness grade.

A first voltage-time diagram 24 relates to water having an hardness of 0.7° F. (French degrees). A second voltage-time diagram 26 relates to water having an hardness of 35° F. (French degrees). A third voltage-time diagram 24 relates to a saturated salt solution.

If a voltage value upper than 3.5 V occurs, then the liquid in the liquid container 10 is at the lower level 16. If a voltage value between 2.25 V and 3.5 V occurs, then the liquid in the liquid container 10 is at the medium level 14. If a voltage value below 2.25 V occurs, then the liquid in the liquid container 10 is at the upper level 12.

FIG. 4 clarifies the relationship between the voltage ranges and the different hardness grades. Thus, the level measurement system of the present invention is also suitable for detecting the hardness grade of the liquid, in particular water.

In order to prevent polarization effects on the electrodes, the polarity of the applied voltage between the voltage terminal V+ and the ground terminal GND is inverted according to a predetermined scheme. The polarization effects may lead to accumulations of substances on the electrodes. For example, an alternating current may be applied between the voltage terminal V+ and the ground terminal GND.

A major advantage of the level measurement system according to the present invention refers to the detection of the plurality of liquid levels via one single analog-digital converter channel. Additionally, said level measurement system allows the determination of the hardness grade of the liquid, in particular water. Further, the polarity of the applied voltage between the voltage terminal V+ and the ground terminal GND is inverted in order to avoid polarization effects on the electrodes.

Although two illustrative embodiments of the present invention have been described herein with reference to the accompanying drawings, it is to be understood that the present invention is not limited to these precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 liquid container
12 upper level
14 medium level
16 lower level
18 upper electrode
20 medium electrode
22 lower electrode
24 first voltage-time diagram
26 second voltage-time diagram
28 third voltage-time diagram
A first terminal
B second terminal
C third terminal
V+ voltage terminal
GND ground terminal
R resistor element
R1 resistor element
R2 resistor element
R3 resistor element
RP1 resistor element
RP2 resistor element
RR1 resistor element
RR2 resistor element
RW1 resistance of the liquid
RW2 resistance of the liquid
RW3 resistance of the liquid

The invention claimed is:

1. A level measurement system for conductive liquids comprising:
a liquid container;
at least three electrodes arranged inside the liquid container; and
a network comprising a plurality of resistor elements, at least two input terminals for applying an external voltage, and at least two output terminals providing a voltage depending on the level of the conductive liquid in the liquid container, wherein:
the at least three electrodes are connected to the network, at least three different levels of conductive liquids in the liquid container are determined by measuring a voltage across one of the resistor elements of the network, the at least two output terminals corresponding to nodes on each end of the one of the resistor elements, and
the network comprises:
a first input terminal connected to a supply voltage and a second input terminal connected to ground;
a first resistor element and a second resistor element serially connected to each other and between the first and second input terminals;
a third resistor element connected to the first input terminal and a fourth resistor element connected to the second input terminal, the third and fourth resistor elements being serially connected to each other and connected in parallel to the first and second resistor elements;
a fifth resistor element connected to a first electrode at an upper level and to a node between the third and fourth resistor elements;
a sixth resistor element connected to a second electrode at a middle level and to the node between the third and fourth resistor elements; and
a third electrode at a lower level connected to ground.

2. The level measurement system according to claim 1, wherein the level measurement system includes or corresponds with an analog-digital converter for processing the level of the conductive liquid in the liquid container.

3. The level measurement system according to claim 1, wherein the at least two output terminals of the network are connected or connectable to an input of the analog-digital converter.

4. The level measurement system according to claim 1, wherein the external voltage is a direct current voltage.

5. The level measurement system according to claim 1, wherein the external voltage is an alternating current voltage.

6. The level measurement system according to claim 1, wherein the level measurement system is provided for determining the electric conductivity of the liquid.

7. The level measurement system according to claim 1, wherein the level measurement system is provided for determining the hardness grade of water or liquids including water.

8. The level measurement system according to claim 1, wherein predetermined voltage ranges at the at least two output terminals correspond with discrete levels of the conductive liquid in the liquid container.

9. A domestic appliance comprising at least one liquid container for supplying said domestic appliance with liquid, wherein the domestic appliance comprises at least one level measurement system according to claim 1.

10. The level measurement system according to claim 1, wherein the at least two output terminals are provided across the fourth resistor element such that the voltage across the fourth resistor element can be measured to determine the at least three different levels of conductive liquids in the liquid container.

* * * * *